(12) United States Patent
Hwang et al.

(10) Patent No.: US 12,415,707 B2
(45) Date of Patent: Sep. 16, 2025

(54) BUILDING-ATTACHABLE MOVING SYSTEM AND METHOD OF A MOBILITY

(71) Applicants: Hyundai Motor Company, Seoul (KR); Kia Corporation, Seoul (KR)

(72) Inventors: Jin Ho Hwang, Cheonan-Si (KR); Dong Eun Cha, Hwaseong-Si (KR); Sang Heon Lee, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 257 days.

(21) Appl. No.: 17/981,937

(22) Filed: Nov. 7, 2022

(65) Prior Publication Data
US 2024/0059527 A1   Feb. 22, 2024

(30) Foreign Application Priority Data
Aug. 22, 2022   (KR) .......................... 10-2022-0105004

(51) Int. Cl.
| | |
|---|---|
| *B66B 9/00* | (2006.01) |
| *B60F 5/02* | (2006.01) |
| *B64C 39/02* | (2023.01) |
| *B64U 20/50* | (2023.01) |
| *B66B 9/16* | (2006.01) |
| *E04B 1/343* | (2006.01) |

(Continued)

(52) U.S. Cl.
CPC .............. *B66B 9/003* (2013.01); *B60F 5/02* (2013.01); *B64C 39/024* (2013.01); *B64U 20/50* (2023.01); *B66B 9/16* (2013.01); *E04B 1/343* (2013.01); *E04H 1/005* (2013.01); *B64U 2101/61* (2023.01); *B64U 2201/20* (2023.01)

(58) Field of Classification Search
CPC ....... B66B 9/003; B66B 9/16; B64U 2201/20; B64U 20/50; B64U 2101/61; E04H 1/005; B64C 39/024; B60F 5/02
USPC .......................................................... 187/239
See application file for complete search history.

(56) References Cited

U.S. PATENT DOCUMENTS

| | | | | |
|---|---|---|---|---|
| 1,563,792 A | * | 12/1925 | Rickard | .................. B66B 9/025 |
| | | | | 187/406 |
| 9,409,042 B2 | | 8/2016 | Na | |

(Continued)

FOREIGN PATENT DOCUMENTS

| | | |
|---|---|---|
| KR | 10-0787812 | 12/2007 |
| KR | 10-2022-0049275 | 4/2022 |

*Primary Examiner* — Brent W Herring
(74) *Attorney, Agent, or Firm* — Morgan Lewis & Bockius LLP

(57) ABSTRACT

A building-attachable moving system includes a mobility including a coupling device coupled to outside and an internal space becoming, when the mobility is coupled to an external surface of a building by the coupling device, a portion of an indoor space of the building, and a moving device including a guide member dividing the external surface of the building into areas and driving modules coupled to be movable along the guide member, the moving device moving the mobility from one area to another on the external surface as the deriving modules move, wherein the coupling device is provided in plurality, some of the coupling devices are decoupled when the mobility moves from a current area to a moving area, the driving modules of the current area are moved, the decoupled coupling devices are coupled with the driving modules of the moving area, and the mobility moves to the moving area.

19 Claims, 9 Drawing Sheets

(51) Int. Cl.
*E04H 1/00* (2006.01)
*B64U 101/61* (2023.01)

(56) References Cited

U.S. PATENT DOCUMENTS

| | | | |
|---|---|---|---|
| 10,150,524 B2* | 12/2018 | Evans | B60F 5/02 |
| 10,745,247 B2* | 8/2020 | Witczak | B66B 7/047 |
| 2005/0056492 A1* | 3/2005 | Nielsen | B66B 9/025 |
| | | | 187/269 |
| 2013/0206505 A1 | 8/2013 | Tremblay | |
| 2017/0057786 A1* | 3/2017 | Witczak | B66B 7/046 |
| 2018/0237086 A1* | 8/2018 | Evans | B60F 5/02 |
| 2018/0319630 A1* | 11/2018 | Dayrell | B66B 9/003 |
| 2021/0229512 A1* | 7/2021 | Opalinski | B60G 3/20 |
| 2023/0011746 A1* | 1/2023 | Turco | B65G 1/0492 |
| 2023/0039298 A1* | 2/2023 | Keppner | B62D 11/02 |
| 2024/0308603 A1* | 9/2024 | Keppner | B62D 55/084 |

* cited by examiner

FIG. 2
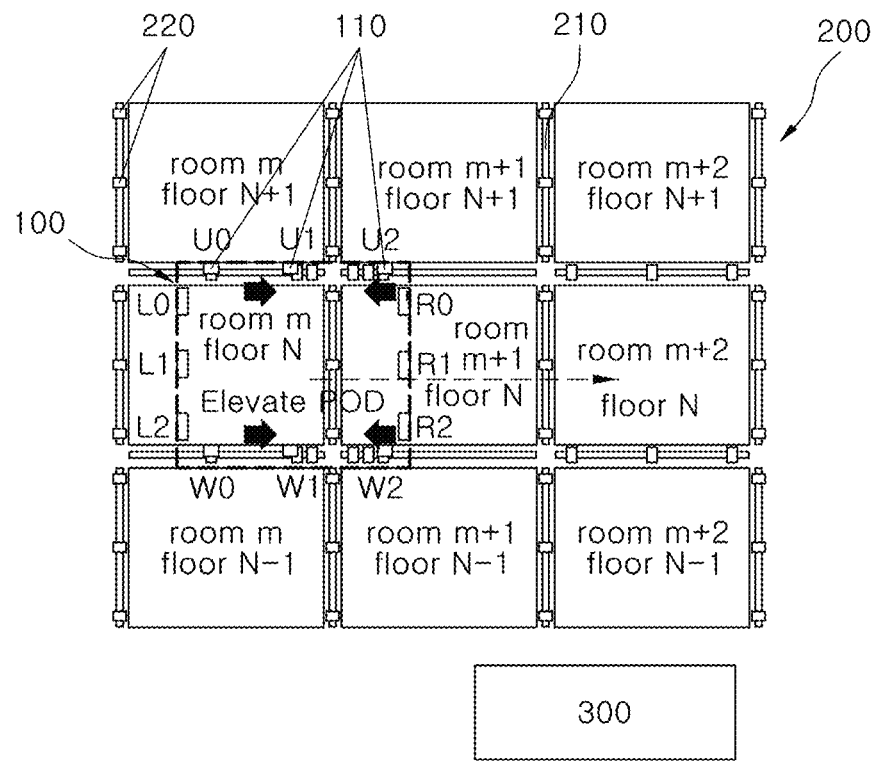
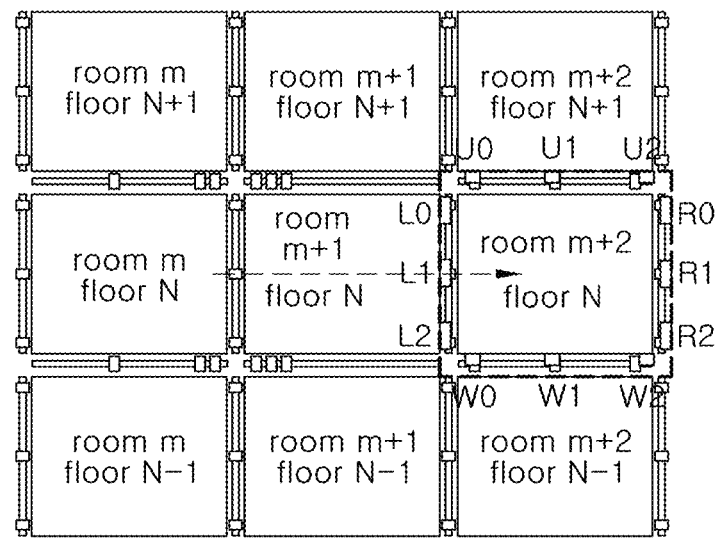

BUILDING-ATTACHABLE MOVING SYSTEM AND METHOD OF A MOBILITY

CROSS REFERENCE TO RELATED APPLICATION

The present application claims priority to Korean Patent Application No. 10-2022-0105004, filed on Aug. 22, 2022, the entire contents of which is incorporated herein for all purposes by this reference.

BACKGROUND OF THE PRESENT DISCLOSURE

Field of the Present Disclosure

The present disclosure relates to a building-attachable moving system and method of a mobility, and more particularly, a technology of coupling a mobility to a building as a portion of the building and moving the mobility on the external surface of the building.

Description of Related Art

Future mobility will be used as a means of transportation with various functions, and active development is currently being conducted centering on air mobility as well as ground mobility. Furthermore, the future mobility is being developed into a concept of comprehensive mobility by combining all kinds of mobility away from each concept of ground mobility and aviation mobility, and a mobility (mobile structure) is not simply used as a means of transportation, but as a space for passengers to engage in various activities within mobility.

Therefore, the mobility allows to overcome the temporal or spatial constraints of the mobility and integrate the mobility into daily life by amalgamating the mobility with buildings that currently engage in residential or economic activities, the mobility can move to place to place in various ways, and people can engage in various activities such as residential or economic activities through the mobility.

When the mobility is attached to a building, there has been a demand for a technology to move it to another location of the building while being attached to the building according to the user's convenience.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a mobility comprised of a moving device moving along the edge portions of areas formed by dividing the external surface of a building and a coupling device coupled to the moving device, the mobility easily moving on the external surface of the building such that, when the mobility moves to another area in the state of being coupled to the moving device, a portion of the coupling device is decoupled for the current moving device to move the mobility and for the decoupled coupling device is coupled to the moving device of the moving area.

A building-attachable moving system for mobility according to an exemplary embodiment of the present disclosure may include a mobility including a coupling device being coupled to outside and an internal space becoming, when the mobility is coupled to an external surface of a building by the coupling device, a portion of an indoor space of the building, and a moving device including a guide member dividing the external surface of the building into areas and a plurality of driving modules coupled to be movable along the guide member, the coupling devices of the mobility being coupled to the driving modules to be connected to the building and the moving device moving the mobility from one area to another area on the external surface of the building as the driving modules move, wherein the coupling device is provided in plurality, some of the coupling devices are decoupled from the driving modules when the mobility moves from a current area to a moving area, the driving modules of the current area are moved, the decoupled coupling devices are coupled with the driving modules of the moving area, and the mobility moves to the moving area.

The guide member may include a lead screw extending in a longitudinal direction, and the driving modules includes a fastening nut fastened to the lead screw and a motor rotating the fastening nut.

The coupling devices may be provided in plurality along an edge portion of a surface to which the mobility is coupled to the building.

The plurality of coupling devices may be respectively provided at corners of the surface to which the mobility is coupled to the building and additionally disposed between the respective corners.

The coupling device in a direction crossing a moving direction of the mobility is, when the mobility moves from the current area to the moving area, decoupled.

The coupling devices are, when the mobility moves from the current area to the moving area, decoupled in an order of the coupling device close to a moving direction of the mobility and moved by the driving modules of the current area, the decoupled coupling devices are coupled to the driving devices of the moving area, and then the coupling devices of the current area are decoupled from the coupling devices of the current area.

The driving modules of the moving area may move, when the mobility moves from the current area to the moving area, in the moving direction to be first coupled to the decoupled coupling devices.

The areas partitioned by the moving device may correspond each to the surface to which the mobility is coupled to the building.

The system may further include a controller configured for receiving the moving area of the mobility from a user to control operations of the coupling devices and the moving device.

The mobility may further include a flight device configured for taking off and landing and is capable, when all of the coupling devices are decoupled, of taking off by operation of the flight device.

The flight device may be, when the mobility is coupled to the external surface of the building, folded.

The system may further include a controller configured for receiving a coupling area of the mobility from a user to control operations of the flight device and to control, when arriving to the coupling area, the coupling device to couple the mobility to the building.

The coupling device may include a shaft extending toward the driving module and a magnetic module provided on the shaft and engaged or disengaged with the driving module by change in a magnetic circuit.

The coupling device may further include a hinge member rotating the shaft and a first cover covering the shaft, the moving device may further include a second cover covering the guide member and the driving modules, and the first and second covers may be, when the shaft rotates, opened.

A building-attachable moving method of a mobility according to an exemplary embodiment of the present disclosure includes receiving an input of a location of the moving area of the mobility and controlling operations of coupling devices and moving device based on the location of the moving area input.

The method may further include identifying locations of other mobilities coupled to the building after receiving the input of the location.

The controlling may include decoupling all of the coupling devices in a direction crossing the direction in which the mobility moves.

The controlling may include decoupling the coupling device close in a direction in which the mobility moves and moving the coupled driving modules to an end portion of the moving direction thereof.

The controlling may include moving the driving modules of the moving area to a location corresponding to the coupling devices moved to the moving area and coupling the driving modules to the coupling devices.

The controlling may include decoupling, when the driving modules move to the end portion of the moving direction, the coupling devices.

The building-attachable moving system and method of a mobility according to an exemplary embodiment of the present disclosure is advantageous in terms of improving the user's convenience by moving a mobility without being separated from a building so that the mobility is provided with a plurality of coupling devices configured for being coupled to the building and a plurality of driving modules coupled to and moving along guide members extending in a form of a lattice to divide the external surface of the building, and when the mobility moves from a current area to a moving area, the coupling device closest in the moving direction of the mobility is decoupled, the mobility is moved by the remaining coupled driving modules, and the coupling devices moved to the moving area are coupled to the driving modules of the moving area to move the mobility to the moving area up and down and left and right in the state of being coupled to the external surface of the building.

Also, the mobility is provided with a flight device making it possible for the mobility to fly and be coupled to any area of the external surface of the building, improving user's convenience.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 2 and FIG. 3 are front views exemplarily illustrating movement of a mobility of a building-attachable movement system of a mobility according to an exemplary embodiment of the present disclosure;

Figure 1:
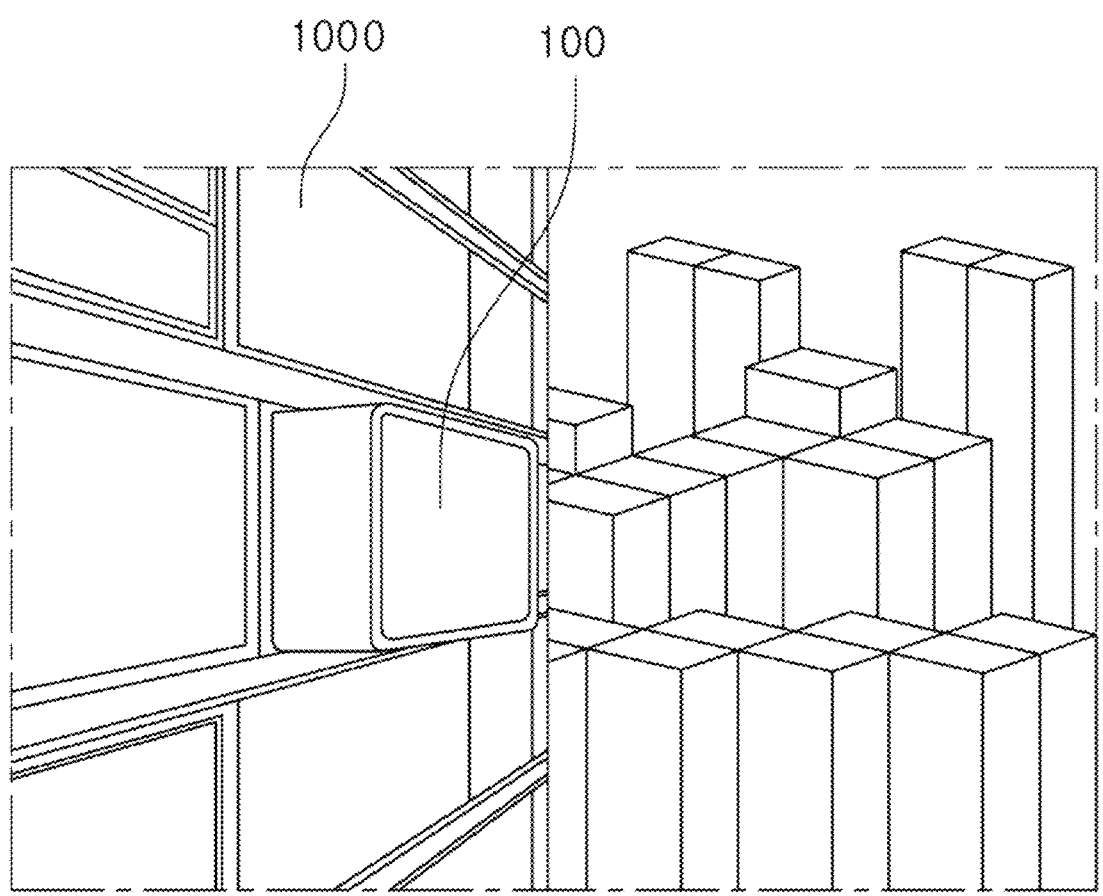
FIG. 1 is a perspective view exemplarily illustrating a mobility coupled to a building according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, descriptions are made of the exemplary embodiments disclosed in the present specification with reference to the accompanying drawings in which the same reference numbers are assigned to refer to the same or like components and redundant description thereof is omitted.

As used in the following description, the suffix "module" and "unit" are granted or used interchangeably in consideration of easiness of description but, by itself, having no distinct meaning or role.

Furthermore, detailed descriptions of well-known technologies related to the exemplary embodiments disclosed in the present specification may be omitted to avoid obscuring the subject matter of the exemplary embodiments disclosed in the present specification. Furthermore, the accompanying drawings are only for easy understanding of the exemplary embodiments disclosed in the present specification and do not limit the technical spirit disclosed herein, and it should be understood that the exemplary embodiments include all changes, equivalents, and substitutes within the spirit and scope of the present disclosure.

As used herein, terms including an ordinal number such as "first" and "second" may be used to describe various components without limiting the components. The terms are used only for distinguishing one component from another component.

It will be understood that when a component is referred to as being "connected to" or "coupled to" another component, it may be directly connected or coupled to the other component or intervening component may be present. In contrast, when a component is referred to as being "directly connected to" or "directly coupled to" another component, there are no intervening component present.

As used herein, the singular forms are intended to include the plural forms as well, unless the context clearly indicates otherwise.

It will be further understood that the terms "comprises" or "has," when used in the present specification, specify the presence of a stated feature, number, step, operation, component, element, or a combination thereof, but they do not preclude the presence or addition of one or more other features, numbers, steps, operations, components, elements, or combinations thereof.

For example, each controller may include a communication device communicating with another controller or sensor to control a function in charge, a memory that stores operating system or logic instructions and input/output information, and one or more processors for determination, operation, and decision-making necessary for functions in charge.

Figure 3:
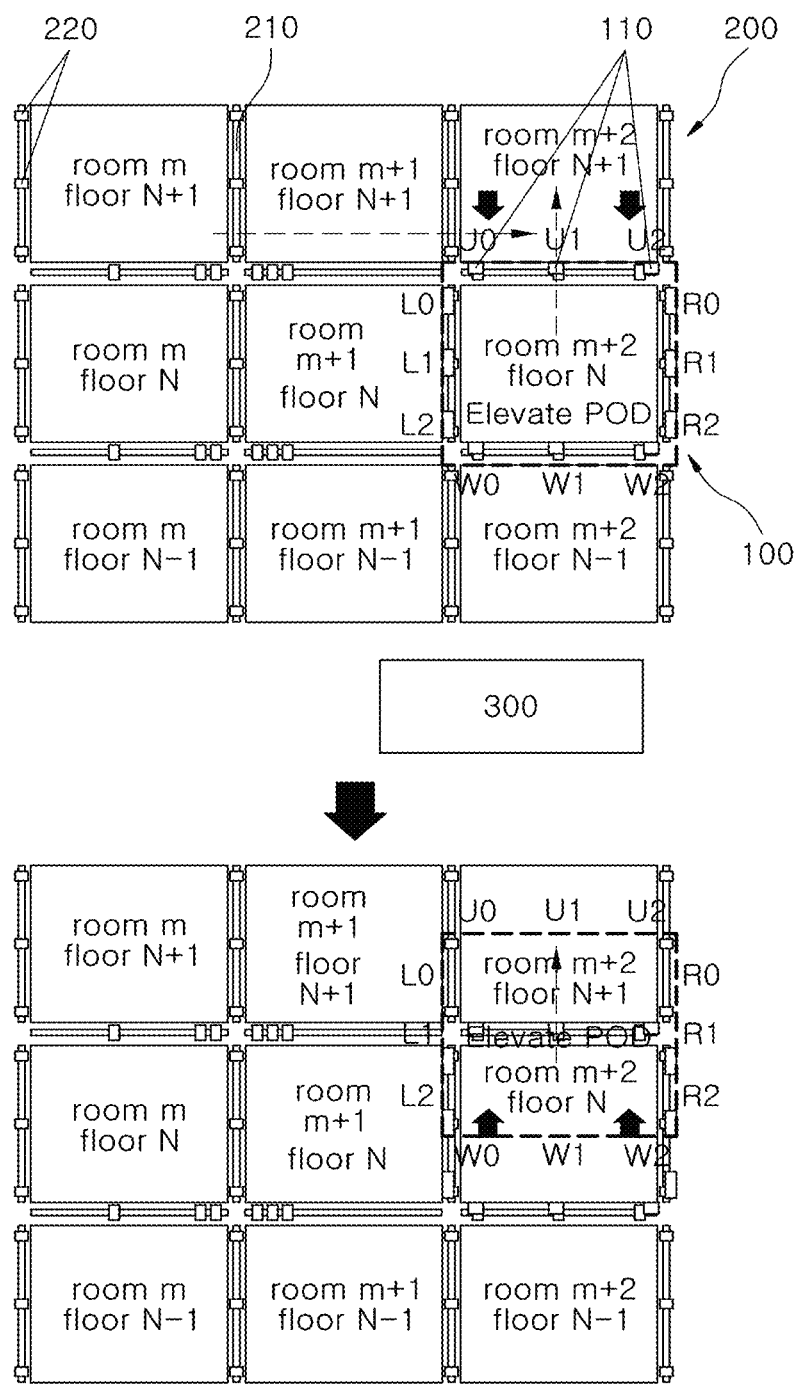
Figure 4:
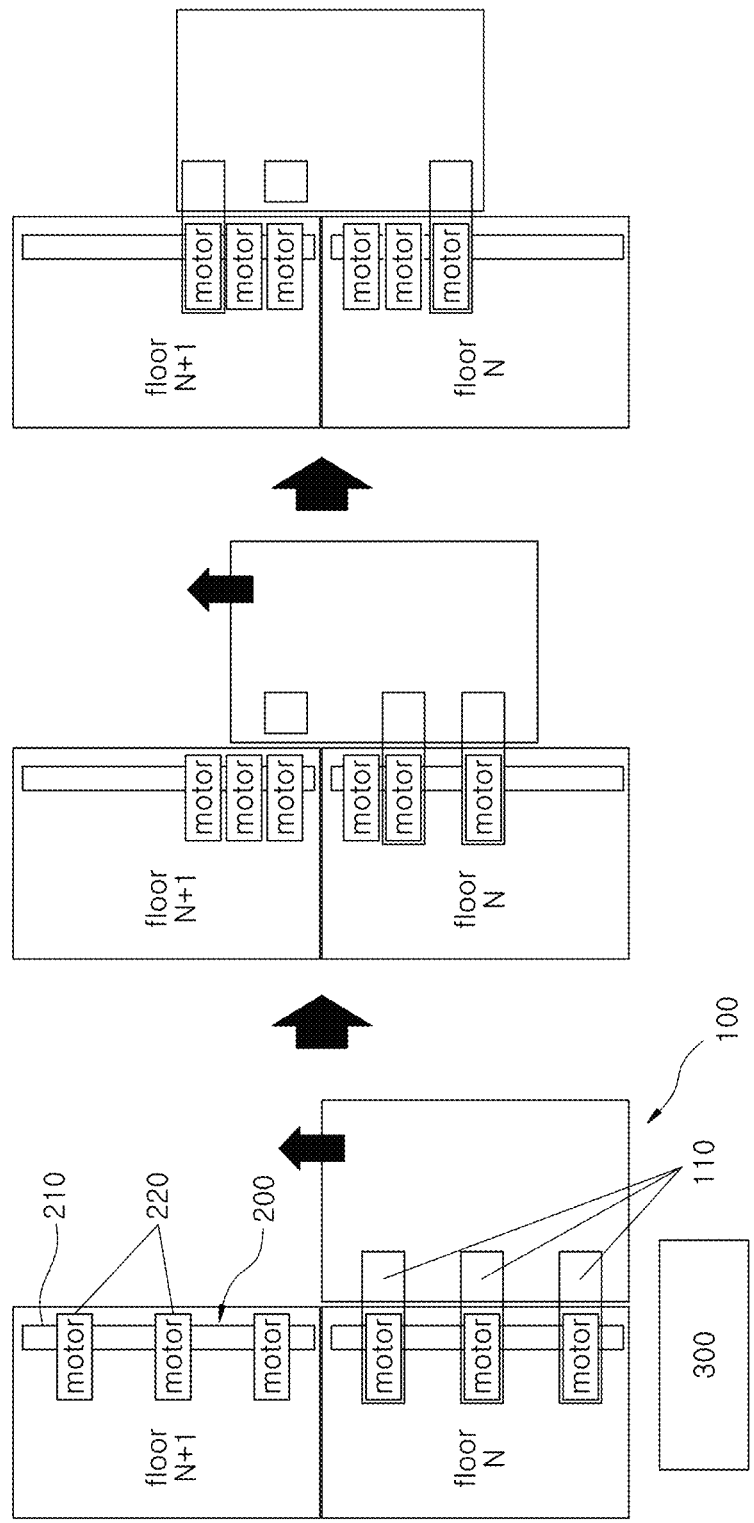
FIG. 4 is a side view exemplarily illustrating movement of a mobility of a building-attachable moving system of a mobility according to an exemplary embodiment of the present disclosure.
Figure 5:
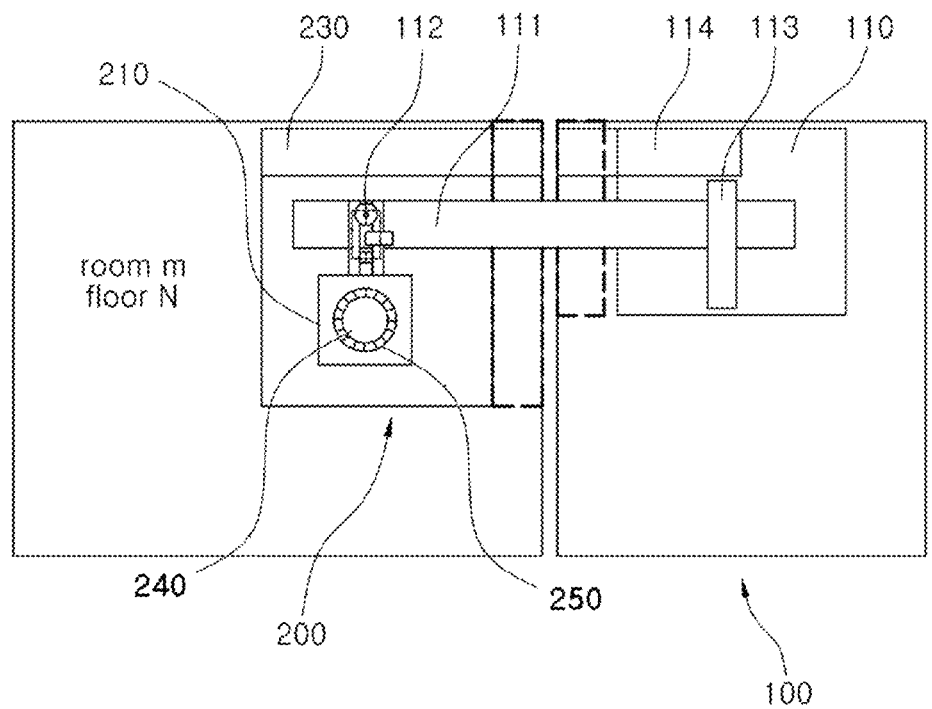
FIG. 5 is a side view exemplarily illustrating a coupling of a coupling device of a building-attachable moving system of a mobility according to an exemplary embodiment of the present disclosure.
Figure 6:
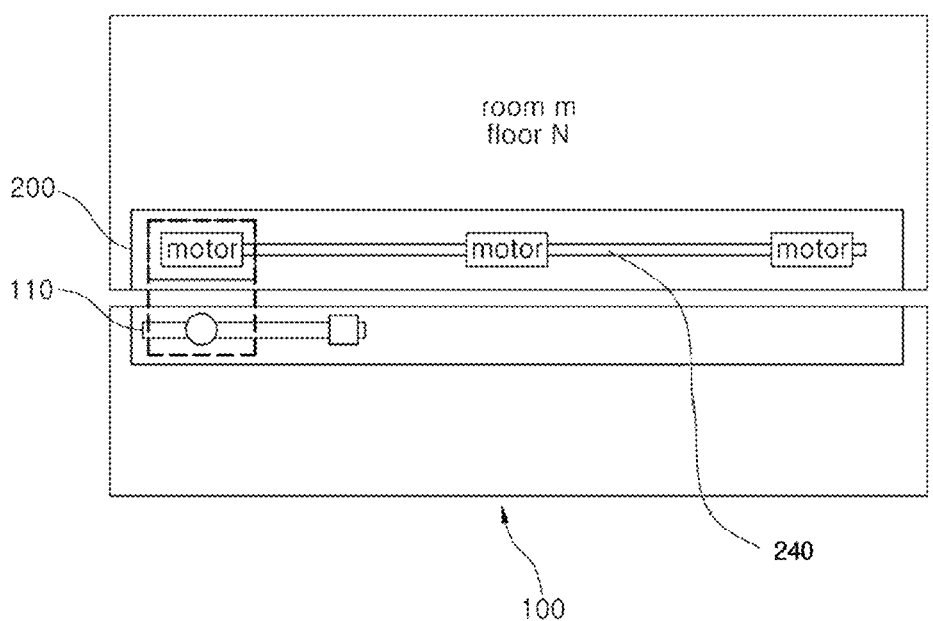
FIG. 6 is a plan view exemplarily illustrating a coupling of a coupling device of a building-attachable moving system of a mobility according to an exemplary embodiment of the present disclosure.
Figure 7:
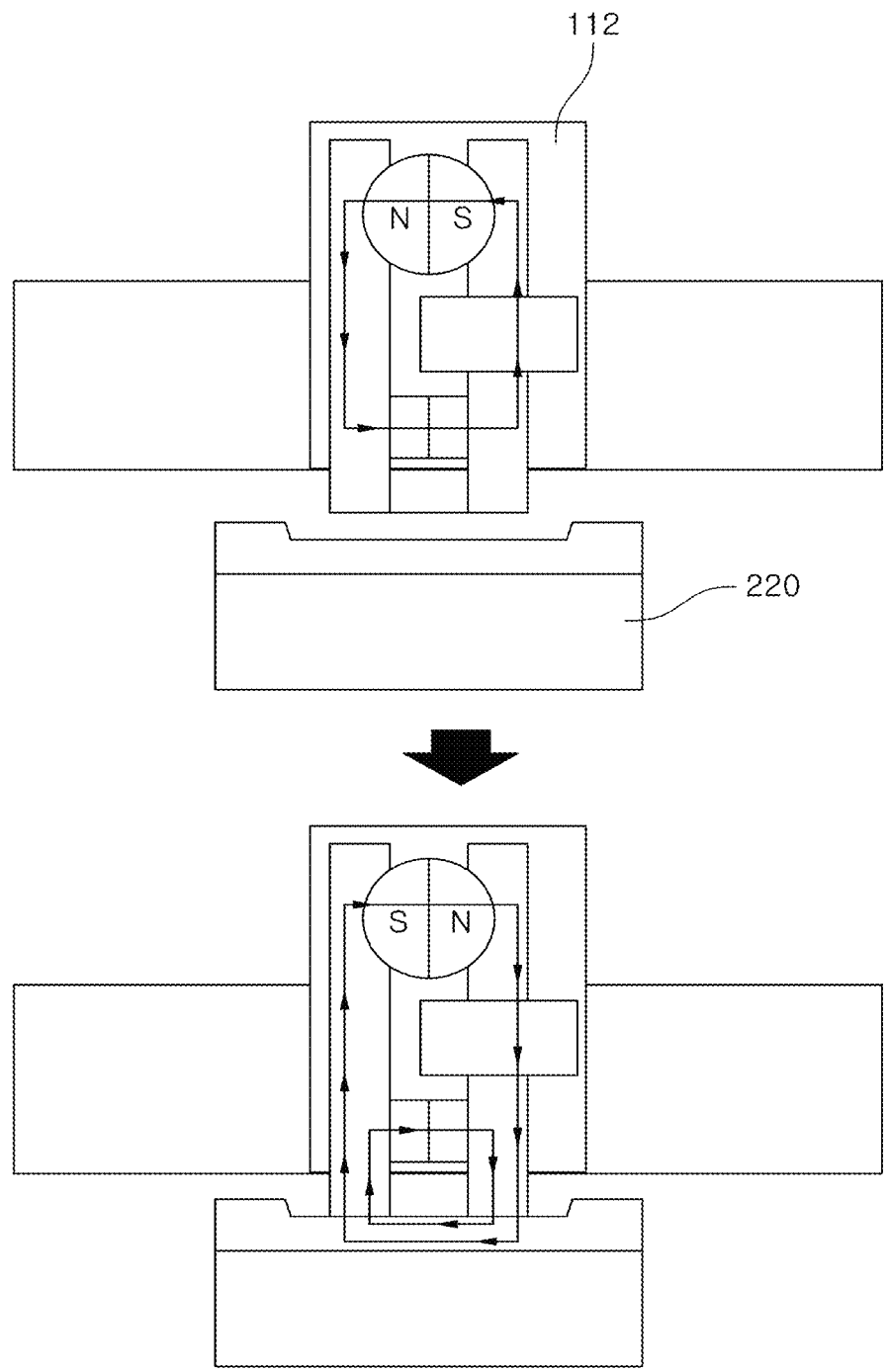
FIG. 7 is a view exemplarily illustrating a coupling of a magnetic module of a building-attachable moving system according to an exemplary embodiment of the present disclosure.
Figure 8:
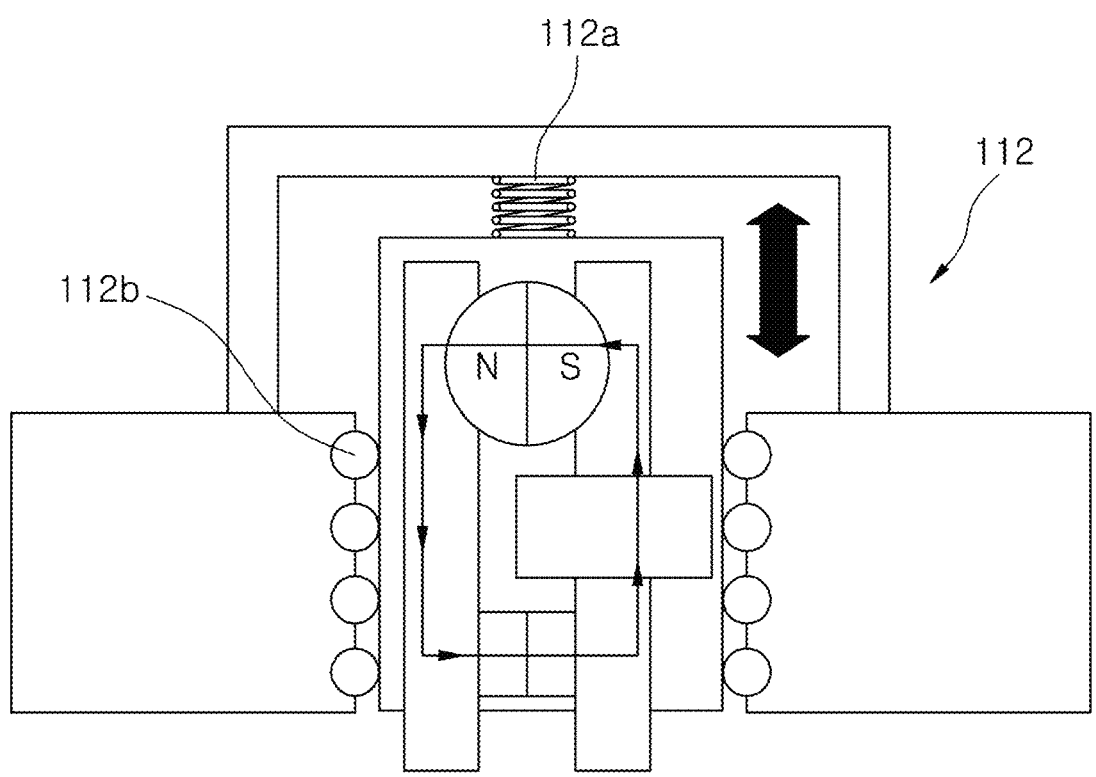
FIG. 8 is a view exemplarily illustrating a coupling of a magnetic module of a building-attachable moving system of a mobility according to an exemplary embodiment of the present disclosure.

FIG. 1 is a perspective view of the mobility 100 coupled to a building 1000 according to an exemplary embodiment of the present disclosure, FIG. 2 and FIG. 3 are front views exemplarily illustrating movement of the mobility 100 of the building-attachable moving system for the mobility 100 according to an exemplary embodiment of the present disclosure, FIG. 4 is a side view exemplarily illustrating movement of the mobility 100 of the building-attachable moving system of the mobility 100 according to an exemplary embodiment of the present disclosure, FIG. 5 is a side view exemplarily illustrating coupling of the coupling device 110 of the building-attachable moving system for the mobility 100 according to an exemplary embodiment of the present disclosure, FIG. 6 is a plan view exemplarily illustrating coupling of the coupling device 110 of the building-attachable moving system for the mobility 100 according to an exemplary embodiment of the present disclosure, FIG. 7 is a view exemplarily illustrating engagement of the magnetic module 112 of the building-attachable moving system according to an exemplary embodiment of the present disclosure, and FIG. 8 is a view exemplarily illustrating the magnetic module 112 of the building-attachable moving system for the mobility 100 according to an exemplary embodiment of the present disclosure.

An exemplary embodiment of a building-attachable moving system for the mobility 100 according to an exemplary embodiment of the present disclosure will be described with reference to FIG. 1, FIG. 2, FIG. 3, FIG. 4, FIG. 5, FIG. 6, FIG. 7, and FIG. 8.

The building-attachable moving system for the mobility 100 according to an exemplary embodiment of the present disclosure includes the mobility including a coupling device 110 coupled to the outside on an external surface thereof and including an internal space that becomes, when coupled to the external surface of the building, a portion of the indoor space of the build; and a moving device 200 including a guide member 210 extending in a form of a lattice dividing the external surface of the building into areas and a plurality of driving modules 220 connected to move along the guide member 210, the coupling devices 110 of the mobility 100 being coupled to the driving modules 220 to be connected to the building to move the mobility 100 between areas on the external surface of the building; and the coupling device 110 is provided in plurality, some of the coupling devices 110 are decoupled from the driving module 220, when the mobility 100 moves from the current area to the moving area, the driving modules 220 of the current area move, and the decoupled coupling devices 110 are coupled to the driving modules 220 of the moving area, and the mobility 100 may be moved to the moving area.

The mobility 100 may be boarded by a passenger and may be driven separately by providing a driving unit.

The coupling device 110 provided in the mobility 100 may extend toward the building, the extended coupling device 110 is coupled to the inside of the building, and the door provided in the mobility 100 and the door provided in the building are positioned to correspond to each other such that, when each door is opened, the internal space of the mobility 100 may be used as an indoor space of the building.

As an exemplary embodiment of the present disclosure, the mobility 100 may be provided with a space required by the user, such as a store or a personal computer (PC) room and may be coupled to the building according to the user's request so that the user can receive various services with a different mobility 100 moving and coupling to the building without location movement in the building.

The moving device 200 includes a guide member 210 extending in a form of a lattice dividing the external surface of the building into a plurality of areas, and a plurality of driving modules 220 are coupled to the guide member 210 to move along the extended direction.

When the coupling devices 110 provided in the mobility 100 are coupled to the moving device 200, some of the coupling device 110 are decoupled, the driving modules 220 are moved from the current area to the moving area, the driving modules 220 located in the moving area are newly coupled to the decoupled coupling devices 110, afterward the coupling devices 110 of the current location are decoupled, and the driving modules 220 of the moving area are moved to move the mobility 100 and position the mobility 100 in the moving area.

In the present manner, the mobility 100 may move to a moving area targeted by the user in the state of being coupled to the external surface of the building without being separated.

As an exemplary embodiment of the moving device 200, the guide member 210 may include a lead screw 240 extending in the longitudinal direction, and the driving module 220 may include a fastening nut 250 fastened to the lead screw 240 and a motor configured for rotating the fastening nut 250.

As shown in FIG. 2, FIG. 3 and FIG. 4, the guide member 210 may extend in the longitudinal direction and may be formed of a lead screw 240 including a thread formed on the outside thereof, and the driving module 220 may include the fastening nut 250 engaged with the lead screw 240 and a motor configured for rotating the fastening nut 250 so that the fastening nut 250 rotates, when the motor is operating, to move in the extended direction of the lead screw 240 precisely according to the number of rotations of the motor.

Furthermore, the moving device 200 may be formed in various manners such as a linear gear and a pinion gear engaged with the rear gear.

The coupling device 110 may be provided in plurality along the edge portion of the surface where the mobility 100 is coupled to the building.

As shown in FIG. 2 and FIG. 3, the coupling device 110 may be provided in plurality on the edge portion of the coupling surface to which the mobility 100 is coupled to the building and may be connected to the moving device 200 dividing the external surface of the building into a plurality of areas, being coupled to the building safely.

As the coupling devices 110 are provided on the edge portion of the mobility 100, when the door of the mobility 100 and the door provided on the external surface of the building are connected to each other, the internal space of the mobility 100 may be used as a portion of the indoor space of the building.

The plurality of coupling devices 110 may be respectively provided at the corners of the surface where the mobility 100 is coupled to the building and may be additionally disposed between the respective corners.

As shown in FIG. 2 and FIG. 3, the coupling devices 110 are provided at the corners of the horizontal and vertical edge portions of the mobility 100, the coupling device 110 is additionally provided at the corners, and the driving modules 220 may be provided in a number corresponding to the coupling device 110 to be safely coupled to the external surface of the building.

When the mobility 100 moves from the current area to the moving area, the coupling devices 110 in a direction crossing the moving direction may be decoupled.

The plurality of coupling devices 110 provided at the edge portion of the mobility 100 may be coupled to a plurality of driving modules 220 of the moving device 200 when coupled to a building, and the coupling device 110 positioned in a direction crossing the moving direction may be first decoupled when moving from the current area to the moving area.

In the present manner, by decoupling the coupling device 110 located in the direction crossing the moving direction among the coupling devices 110 disposed at the edge portions of the coupling surface of the mobility 100, the mobility 100 may be able to smoothly move without interfering with the movement of the driving modules 220 of the moving device 200.

When the mobility 100 moves from the current area to the moving area, the coupling devices 110 may be sequentially decoupled in the approaching order in the movement direction, moved by the driving module 220 of the current area, and coupled to the coupling devices 110 decoupled from the driving device of the moving area, and the coupling devices 110 of the current area may be decoupled from coupling devices 110 of the current area afterward.

As shown in FIG. 4, when the mobility 100 moves from the current area (Floor N) to the moving area (floor N+1), the coupling devices 110 in the moving direction are first decoupled, and the mobility 100 may be moved by the remaining coupled driving modules 220. Afterward, the coupling devices 110 moved to the moving area (Floor N+1) may be coupled to and moved with the driving modules 220 disposed in the moving area (Floor N+1). Furthermore, when the driving modules move and come into contact with the end portion of the guide member 210, the couplings between the driving modules 220 and the coupling devices 110 are released, and the mobility 100 may be moved to the moving area by the driving modules 220 coupled to the remaining coupling devices 110.

Thus, even when the guide member 210 and the driving module 220 are separated by area, the mobility 100 may be safely moved without being completely decoupled from the external surface of the building.

When the mobility 100 moves from the current area to the moving area, the driving modules 220 of the moving area may move in the moving direction to be first coupled to the decoupled coupling devices 110.

As shown in FIG. 2, FIG. 3 and FIG. 4, for the coupling devices 110 decoupled and moved to the moving area and the driving modules 220 to be coupled to correspond to each other, the driving modules 220 may move to the coupling devices 110 to be coupled to the coupling devices 110 to each other.

In the present manner, the coupling devices 110 and the driving modules 220 provided in a number corresponding to each other on the guide member 210 may be coupled to locations corresponding to each other to move the mobility 100 from the current area to the moving area.

The area partitioned by the moving device 200 may correspond to a surface on which the mobility 100 is coupled to a building.

As shown in FIG. 2 and FIG. 3, the size of an area formed by the guide member 210 dividing the external surface of the building may correspond to a size of a coupling surface of the mobility 100 to be coupled to the external surface of the building so that the coupling devices 110 disposed at the edge portion and the driving modules 220 coupled to the guide member 210 are coupled to correspond to each other and the driving modules 220 are disposed to correspond to all the coupling devices 110 respectively.

Through this, it is possible to form a design that does not give a sense of heterogeneity and integrates the mobility 100 as a portion of the building, when the building and the mobility 100 are coupled to each other.

A controller 300 that receives an input of a moving area of the mobility 100 from a user and is configured to control the operation of the coupling device 110 and the moving device 200 may be further included.

The controller 300 may receive a moving position of the mobility 100 which is input via a user's portable terminal or a separate input device and may control, based on the input, the coupling and decoupling operations of the coupling device 110 and control the driving module 220 of the moving device 200 to be moved to correspond to the coupling device 110 and coupled thereto and movement of the mobility 100.

As shown in FIG. 2, FIG. 3 and FIG. 4, the controller 300 may be provided in an external server, the mobility 100, or the building to move the mobility 100 to a moving area.

Figure 9:
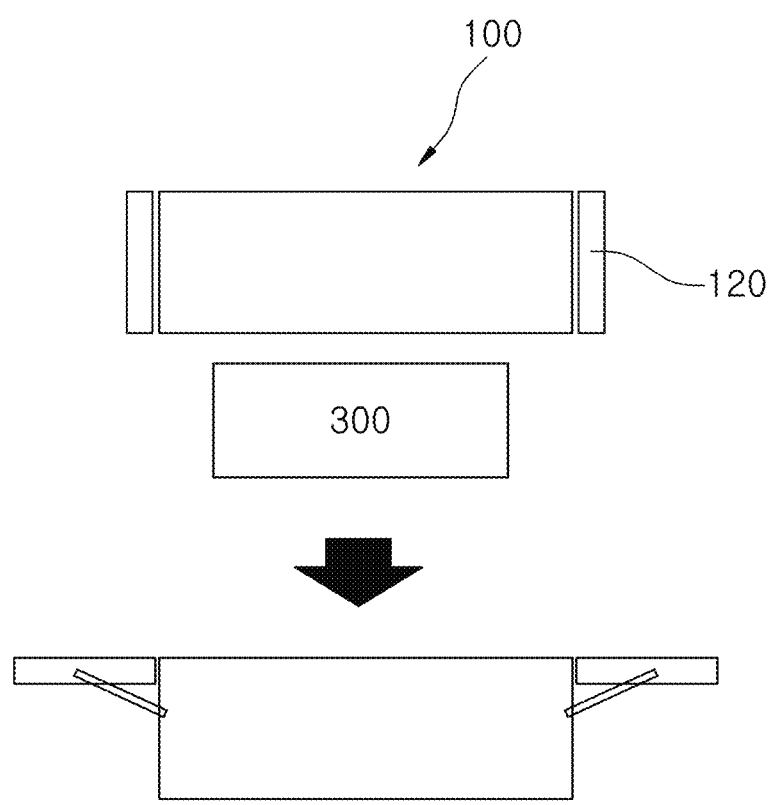
FIG. 9 is a view exemplarily illustrating a flying device of mobility of a building-attachable moving system of a mobility according to an exemplary embodiment of the present disclosure.

FIG. 9 is a view exemplarily illustrating a flight device 120 of the mobility 100 of the building-attachable moving system for the mobility according to an exemplary embodiment of the present disclosure.

With reference to FIG. 9, the mobility 100 further includes a flight device 120 configured for take-off and landing the mobility 100, and when all the coupling devices 110 are decoupled, the mobility 100 may take off by operation of the flight device 120.

In the case where all the coupling devices 110 are decoupled, the mobility 100 may be taken off and flown by the flight device 120, and the mobility 100 in flight may be landed on the external surface of the building and the coupling devices 110 are coupled to the external surface of the building by the driving modules 220 so that the mobility becomes a portion of the building.

Furthermore, as shown in FIG. 9, the flight device 120 may be folded when the modularity 100 is coupled to the external surface of the building.

When the mobility 100 is coupled to the building, the flying device 120 may be folded to be minimized, when the mobility 100 moves on the external surface of the building, collision with other mobility 100 coupled to the building. Furthermore, as the flying device 120 is folded, there is a design effect in which the mobility 100 is integrated with the building.

A controller 300 may be further included to control the operation of the flight device 120 based on the input of a coupling area of the mobility from the user and control, when approaching the coupling area, the coupling devices 110 to couple the mobility 100 to the building.

The controller 300 may be provided in the mobility 100 to control the flight of the mobility 100 and may receive a coupling location via a portable terminal of the user or a separate input device and control the flight device 120 and the coupling device 110 to land and couple the mobility 100 to the external surface of the building.

The coupling device 110 may include a shaft 111 extending toward the driving module 220 and a magnetic module 112 provided on the shaft 111 to be coupled to or decoupled from the driving module 220 through a magnetic circuit change.

As shown in FIG. 5 and FIG. 6, the coupling device 110 is provided with a shaft 111 extending toward the driving module 220, and the magnetic module 112 provided from the shaft 111 to the drive module 220 may couple the shaft and the driving module 220 by magnetic force.

Accordingly, the coupling device 110 may couple the driving module 220 and the mobility 100 to each other.

As shown in FIGS. 7 to 8, the magnetic module 112 may be coupled to the driving module 220 by changing a magnetic circuit to form a magnetic field. The driving module 220 may be provided with an amateur armature including a conductor which is coupled to the magnetic module 112.

In more detail, the magnetic module 112 is provided with a rotary magnetic body 310 rotating on the module body, a fixed magnetic body 320, and a coil 330 into which current is input to rotate the rotary magnetic body 310 and change the magnetic circuit for disconnection from the armature when the magnetic circuit flows only in the module body and for establishing a connection with the armature by magnetic force when the magnetic circuit is directed to, the outside thereof, and the magnetic module 112 may be further provided with a movement guide 112b moving, when the module body is connected to the armature, outward by magnetic force and guiding the movement and a spring 112a moving, when the connection is released, back to the original location.

The coupling device 110 may further include a hinge member 113 in which the shaft 111 rotates and a first cover 114 covering the shaft, the moving device 200 may further include a second cover 230 covering the guide member 210 and the driving module 220, and the first and second covers 114 and 230 may be opened when the shaft 111 rotates.

As shown in FIG. 5 and FIG. 6, the coupling device 110 is provided with a hinge member 113 accommodated in the mobility 100 before the shaft 111 being coupled to the driving module 220 and rotating, when coupled, the shaft 111 to expose the shaft 111 to the outside and a first cover 114 covering the shaft 111 when the shaft 111 is located inside the mobility 100. Furthermore, the moving device 200 may be provided with a second cover 230 for covering the driving module 220 when the driving module 220 is not coupled, and when the coupling device 110 is coupled to the driving module 220, the first and second covers 114 and 230 may be opened at the same time, the shaft 111 may rotate to a side of the driving module 220, and the driving module 220 and the coupling module 110 may be coupled to each other by the magnetic module 112.

Figure 10:
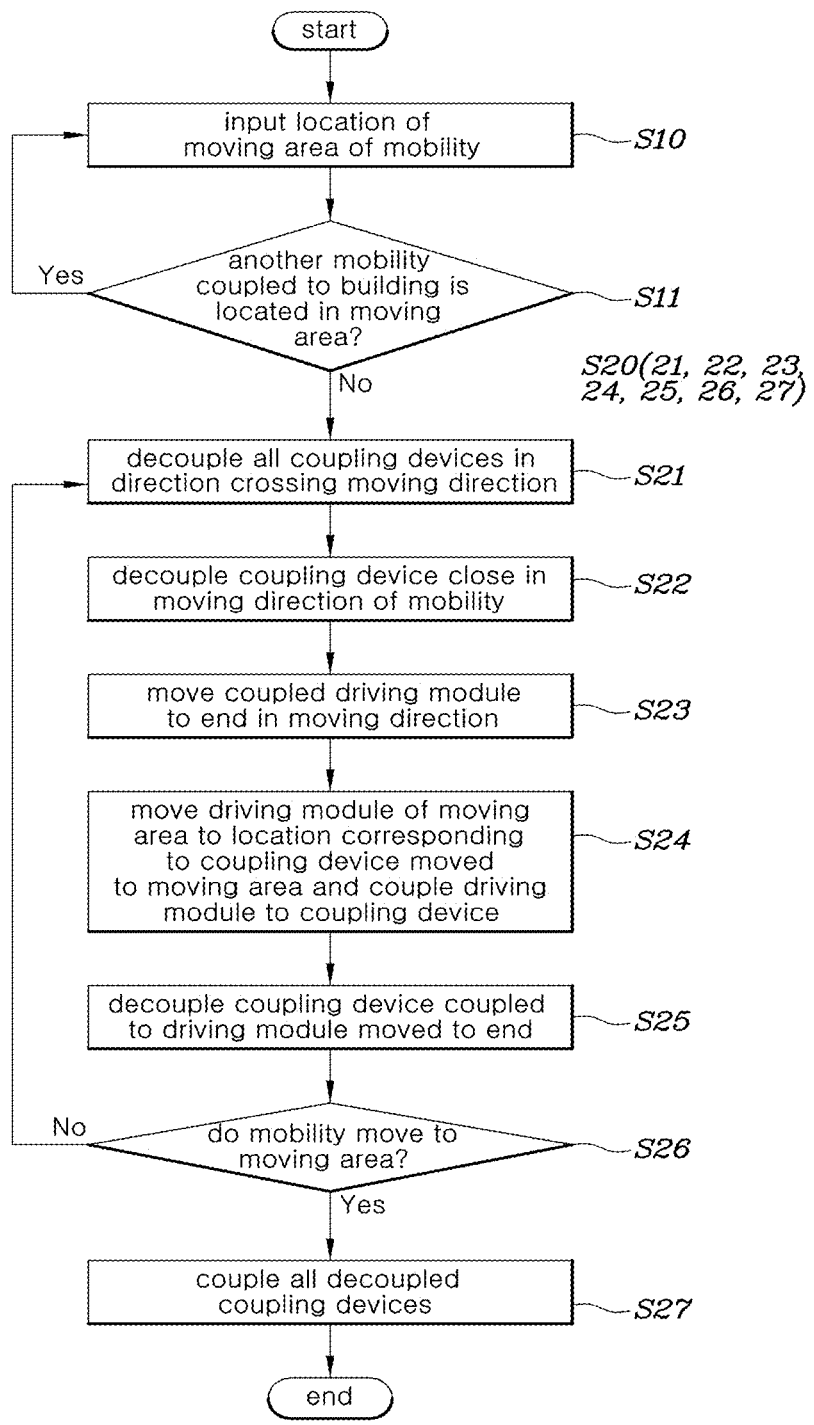
FIG. 10 is a flowchart illustrating a building-attachable moving method of a mobility according to an exemplary embodiment of the present disclosure.

FIG. 10 is a flowchart illustrating a building-attachable moving method of the mobility 100 according to an exemplary embodiment of the present disclosure.

An exemplary embodiment of the building-attachable moving method for the mobility 100 according to an exemplary embodiment of the present disclosure will be described with reference to FIG. 10.

The building-attachable moving method for a mobility 100 according to an exemplary embodiment of the present disclosure includes receiving, at step S10, an input of location of a moving area of the mobility 100 and controlling, at step S20, operations of the coupling device 110 and the moving device 200 based on the location of the moving area input at step S10.

The method may further include determining, at step S11, locations of other mobilities 100 coupled to the building after step S10 receiving the location.

In the controlling step S20, all coupling of the coupling device 110 in a direction crossing the direction in which the mobility 100 moves may be released at step S21.

In the controlling step S20, the coupling device 110 close in the moving direction of the mobility 100 is released at step S22 and the coupled driving module 220 may be moved to the end portion of the moving direction at step S23.

In the controlling step S20, the driving module 220 of the moving area may be moved to a location corresponding to the coupling device 110 moved to the moving area and coupled to the coupling device 110 at step S24.

In the controlling step S20, when the driving module 220 is moved to the end portion in the moving direction, the coupling device 110 may be decoupled at step S25.

A step S26 of determining movement of the mobility 100 to the moving area is further included, and in the controlling step S20, the coupling device 110 decoupled in the moving area may be all coupled to the driving module 220 at step S27.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A building-attachable moving system for a mobility apparatus, the system comprising:
    the mobility apparatus including a plurality of coupling devices being coupled to an external surface of a building and an internal space becoming, when the mobility apparatus is coupled to the external surface of the building by the coupling devices, a portion of an indoor space of the building; and
    a moving device including a guide member dividing the external surface of the building into areas and a plurality of driving modules coupled to be movable along the guide member, the coupling devices of the mobility apparatus being coupled to the driving modules to be connected to the building and the moving device configured to move the mobility apparatus from one area to another area on the external surface of the building as the driving modules move,
    wherein some of the coupling devices are configured to be decoupled from the driving modules when the mobility apparatus moves from a current area to a moving area, the driving modules of the current area are configured to be moved, the decoupled coupling devices are configured to be coupled with the driving modules of the moving area, and the mobility apparatus is configured to move to the moving area,
    wherein the guide member includes a lead screw extending in a longitudinal direction, and the driving modules include a fastening nut fastened to the lead screw and a motor configured to rotate the fastening nut.

2. The system of claim 1, wherein the coupling devices are provided in plurality along an edge portion of a surface to which the mobility apparatus is coupled to the building.

3. The system of claim 2, wherein the plurality of coupling devices is respectively provided at corners of the surface to which the mobility apparatus is coupled to the building and additionally disposed between the respective corners.

4. The system of claim 1, wherein the coupling device in a direction crossing a moving direction of the mobility apparatus is configured to be decoupled, when the mobility apparatus moves from the current area to the moving area.

5. The system of claim 1, wherein the coupling devices are configured to be decoupled, when the mobility apparatus moves from the current area to the moving area, in an order of the coupling device close to a moving direction of the mobility apparatus and moved by the driving modules of the current area, the decoupled coupling devices are configured to be coupled to the driving devices of the moving area, and then the coupling devices of the current area are configured to be decoupled from the coupling devices of the current area.

6. The system of claim 5, wherein the driving modules of the moving area are configured to be move, when the mobility apparatus moves from the current area to the moving area, in the moving direction to be first coupled to the decoupled coupling devices.

7. The system of claim 1, wherein the areas partitioned by the moving device corresponds each to the surface to which the mobility apparatus is coupled to the building.

8. The system of claim 1, further including a controller configured for receiving the moving area of the mobility apparatus from a user to control operations of the coupling devices and the moving device.

9. The system of claim 1, wherein the mobility apparatus further includes a flight device taking off and landing and is configured to be capable, when all of the coupling devices are decoupled, of taking off by operation of the flight device.

10. The system of claim 9, wherein the flight device is, when the mobility apparatus is configured to be coupled to the external surface of the building, folded.

11. The system of claim 9, further including a controller configured for receiving a coupling area of the mobility apparatus from a user to control operations of the flight device and to control, when arriving to the coupling area, the coupling devices to couple the mobility apparatus to the building.

12. A building-attachable moving system for a mobility apparatus, the system comprising:
the mobility apparatus including a plurality of coupling devices being coupled to an external surface of a building and an internal space becoming, when the mobility apparatus is coupled to the external surface of the building by the coupling devices, a portion of an indoor space of the building; and
a moving device including a guide member dividing the external surface of the building into areas and a plurality of driving modules coupled to be movable along the guide member, the coupling devices of the mobility apparatus being coupled to the driving modules to be connected to the building and the moving device configured to move the mobility apparatus from one area to another area on the external surface of the building as the driving modules move,
wherein some of the coupling devices are configured to be decoupled from the driving modules when the mobility apparatus moves from a current area to a moving area, the driving modules of the current area are configured to be moved, the decoupled coupling devices are configured to be coupled with the driving modules of the moving area, and the mobility apparatus is configured to move to the moving area,
wherein each of the coupling devices includes a shaft extending toward the driving module and a magnetic module provided on the shaft and engaged or disengaged with the driving module by change in a magnetic circuit.

13. The system of claim 12, wherein each of the coupling devices further includes a hinge member rotating the shaft and a first cover covering the shaft, the moving device further includes a second cover covering the guide member and the driving modules, and the first and second covers are configured to be opened, when the shaft rotates.

14. A method for controlling the building-attachable moving system for the mobility in claim 1, the method including:
receiving an input of a location of the moving area of the mobility; and
controlling operations of the coupling devices and the moving device based on the location of the moving area input.

15. The method of claim 14 further including identifying locations of other mobilities coupled to the building after receiving the input of the location.

16. The method of claim 14, wherein the controlling includes decoupling all the coupling devices in a direction crossing a direction in which the mobility moves.

17. The method of claim 14, wherein the controlling includes decoupling the coupling device close in a direction in which the mobility moves and moving the coupled driving modules to an end portion of the moving direction.

18. The method of claim 17, wherein the controlling includes moving the driving modules of the moving area to a location corresponding to the coupling devices moved to the moving area and coupling the driving modules to the coupling devices.

19. The method of claim 17, wherein the controlling includes decoupling, when the driving modules move to the end portion of the moving direction, the coupling devices.

* * * * *